A. C. HOPKINS.
SHOCK ABSORBER.
APPLICATION FILED MAY 12, 1921.
1,418,712.   Patented June 6, 1922.
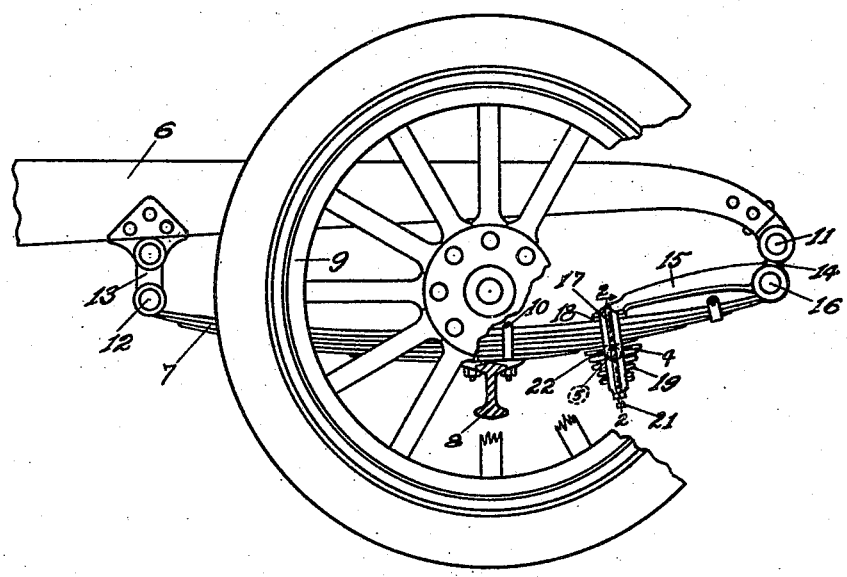
Fig-1-
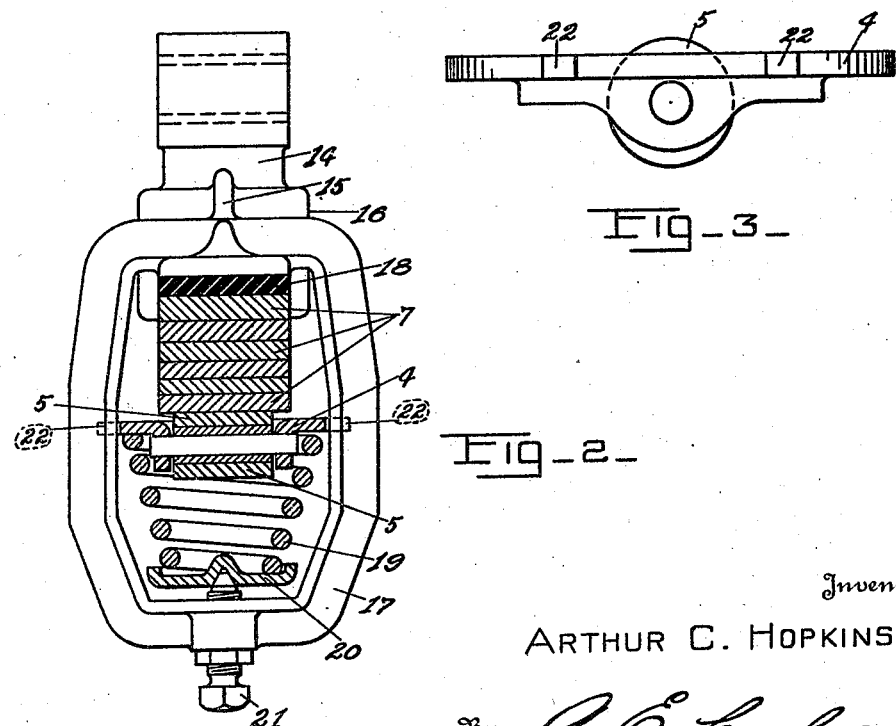
Fig-3-
Fig-2-
Inventor
ARTHUR C. HOPKINS.
By A. E. Carlsen.
Attorney

UNITED STATES PATENT OFFICE.

ARTHUR C. HOPKINS, OF MINNEAPOLIS, MINNESOTA.

SHOCK ABSORBER.

1,418,712.  Specification of Letters Patent.  Patented June 6, 1922.

Application filed May 12, 1921. Serial No. 468,975.

*To all whom it may concern:*

Be it known that I, ARTHUR C. HOPKINS, a citizen of the United States, residing at Minneapolis, in the county of Hennepin and State of Minnesota, have invented certain new and useful Improvements in Shock Absorbers, of which the following is a specification.

This invention relates to shock absorbers for vehicles and the main object is to provide practical and efficient means for relieving the car of longitudinal shocks and strains occasioned by the wheels coming in contact with objects tending to stop their uniform forward movement over the ground. Another object is to so construct the device that it may easily and quickly be installed on practically all motor cars of standard construction, without otherwise modifying their design or construction. Further objects will be disclosed in the course of the following specification and are illustrated in the accompanying drawing, in which:

Fig. 1 is a fractional elevation of the front end of an automobile frame showing the application of my improved shock absorber to a front spring.

Fig. 2 is an enlarged detail sectional view as seen substantially on the line 2—2 in Fig. 1.

Fig. 3 is an enlarged detail view of the plate 4 in which is journaled the roller 5.

Referring to the drawing by reference characters 6 designates one side of the front end of an automobile frame having a spring 7, and a front axle 8 carried by the wheels 9 and secured to the spring 7 by spring clips 10, all of common and well known construction.

Ordinarily the spring 7, here shown as of the half elliptic type, is pivotally secured at its front end to the frame 6 as at 11, its rear end 12 being connected to the frame by a link 13. This I modify by separating the front end of the spring from the frame and pivotally reconnecting it thereto with the arm 14 of a bent lever whose other arm is designated as 15, 16 being the fulcrum of the lever. At the rear end of the arm 15 is an integral yoke 17 which passes around the spring 7 and is vertically movable relative thereto. A piece of rubber or fabric 18 may be secured under the rear end of the arm 15 to deaden the noise caused when it strikes the spring 7.

In order to yieldingly keep the arm 15 down in normal position against the spring 7 I provide a cone spring 19 between the spring and the lower end of the yoke 17. The spring 19 is seated in a flanged plate 20 (see Fig. 2) which is adjustably supported on a set screw 21, so that the tension of the spring may be adjusted to best suit various conditions. An upper plate 4 rests on top of the spring 19 and is provided with ears 22 which slidably guide against the vertical portions of the yoke 17, and thus keep it and the spring in proper position. The plate 4 is further provided with a roller 5 which bears against the spring 7.

It will thus be understood that when a car equipped with my invention is traveling over the road the springs 7 will act in the usual manner in absorbing the vertical shocks imparted to the wheels. When, however, a wheel strikes an object which is high enough above the road surface to cause a rearward shock or vibration such motion will not be imparted directly and positively to the frame, but, because of the yielding rearward movement of the spring 7 and the centers 12 and 16, will be absorbed by the spring 19, the arm 15 and the yoke 17 raising slightly for each such vibration.

It is understood that suitable modifications may be made in the form and structure of this invention if such modifications come within the spirit and scope of the appended claims.

Having now therefore fully shown and described my invention what I claim to be new and desire to protect by Letters Patent is:

1. The combination with a vehicle frame, of a spring disposed longitudinally thereunder and flexibly connected at one end to the frame, a bent lever fulcrumed to the other end of the spring and having an upstanding arm pivotally secured to the frame, a second spring co-actively engageable at one end with the first mentioned spring and at its other end with the other arm of the lever for yieldingly retaining the latter with its upstanding arm in substantially vertical position.

2. In combination with the spring and frame of a vehicle, the rear end of said spring being flexibly connected to the frame, a bent lever fulcrumed at the forward end of the spring and having an upstanding arm pivotally secured to the frame, the other arm of the lever extending rearwardly over the spring, and resilient means for holding said second arm normally down against the spring.

3. In combination with the frame and spring of a vehicle, a bent lever fulcrumed at the forward end of the spring, one arm of said lever being pivoted to the frame and the other arm extending rearwardly over the spring and resting normally thereon, and a spring adapted to yieldingly hold said second mentioned lever arm down against the vehicle spring.

4. A device of the class described consisting of a bent lever adapted to be fulcrumed to one end of a vehicle spring, said lever having a short arm adapted to be pivotally secured to a vehicle frame and a long arm extending back over the spring and resting thereon, a yoke integral with said long arm and passing under the spring, and a coil spring interposed between the lower side of the vehicle spring and the yoke.

5. A device of the class described consisting of a bent lever adapted to be fulcrumed to one end of a vehicle spring, said lever having a short arm adapted to be pivotally secured to a vehicle frame and a long arm extending back over the spring and resting thereon, a yoke integral with said long arm and passing under the spring, a coil spring interposed between the lower side of the vehicle spring and the yoke, and means for adjusting the tension of said coil spring.

6. In combination with a vehicle frame and a spring secured at its rear end thereto by a connecting link, an arm of a bent lever pivotally connecting the front end of the spring to the frame, a second arm of said lever extending back over the spring, a yoke integral with said second arm and being adapted to pass around the spring, means for yieldingly holding said yoke down against the spring, and a roller interposed between said means and spring.

7. In combination with a vehicle frame and a spring secured at its rear end thereto by a connecting link, an arm of a bent lever pivotally connecting the front end of the spring to the frame, a second arm of said lever extending back over the spring, a yoke integral with said second arm and adapted to pass around the spring, means for yieldingly holding said yoke down against the spring, a plate interposed between said means and spring and adapted to be guided by the yoke, and a roller journaled in the plate and coacting with the spring.

8. In combination with the frame and spring of a vehicle, a bent lever fulcrumed at the forward end of the spring, one arm of said lever being pivoted to the frame and the other arm extending rearwardly over the spring and resting normally thereon, a deadening element intermediate the spring and said second mentioned arm, and a second spring adapted to yieldingly hold said second mentioned lever arm down against the vehicle spring.

In testimony whereof I affix my signature.

ARTHUR C. HOPKINS.